July 8, 1924.

W. H. ALLEN 1,500,786

METHOD OF MAKING RUBBER TIRES

Filed May 8, 1920  2 Sheets-Sheet 1

Inventor
Walter H. Allen
By Robert M. Pierson
Atty.

Inventor
Walter H. Allen
By Robert M. Pierson
Atty.

Patented July 8, 1924.

1,500,786

UNITED STATES PATENT OFFICE.

WALTER H. ALLEN, OF AKRON, OHIO, ASSIGNOR TO THE B. F. GOODRICH COMPANY, OF NEW YORK, N. Y., A CORPORATION OF NEW YORK.

METHOD OF MAKING RUBBER TIRES.

Application filed May 8, 1920. Serial No. 379,720.

*To all whom it may concern:*

Be it known that I, WALTER H. ALLEN, a citizen of the United States, residing at Akron, in the county of Summit and State of Ohio, have invented a certain new and useful Method of Making Rubber Tires, of which the following is a specification.

This invention relates to the manufacture of rubber articles, more particularly solid rubber tires, and it has for its object to prevent or reduce the tendency of the vulcanized rubber to chip, split, peel, or break off in fragments. This tendency is particularly noticeable in so-called solid or cushion rubber tires which are built up in the raw state by winding a strip or strips of vulcanizable rubber compound upon a metal rim and then vulcanizing in a mold, and it has been found to be due to the existence of a grain or non-homogeneous molecular structure produced in the rubber by reason of the processes to which it is subjected in manufacture, particularly the sheeting or calendering of the compounded raw stock.

I have discovered that if the calendered or sheeted rubber, while in an unvulcanized condition, is so treated as to break up this grain or fibre, the tendency of the vulcanized article to tear, chip, and break will be substantially reduced. The breaking of the grain may be performed in various ways calculated to interrupt or distort the normal structural continuity of the raw rubber. While I do not limit my invention in a broad sense to a particular mode of performing this operation, I have found that if a calendered sheet or strip of raw rubber stock which is about to be built into a solid tire or other rubber article is subjected to a slitting, gashing, gouging, perforating, or similar operation at numerous closely-adjacent points throughout its structure (the perforations being preferably more or less transverse to the length of the strip), the continuity of the grain or fibre will be effectively interrupted, and when the article is then vulcanized in a mold or otherwise the surfaces of the material in knitting together again do not come together at exactly the original points or in exactly the original manner,—in other words the effect of the numerous wounds or "faults" produced in the raw sheet or strip persists in the vulcanized article after complete reunion or knitting of the parts of the raw structure, without impairing the strength of the finished article, and consequently the grain is permanently destroyed to the extent necessary to secure the desired result.

Fig. 1 of the accompanying drawings shows part of a winding and pressing apparatus for forming a solid tire, and illustrates the gashing or slitting of the strip of raw rubber by means of a knife held in the hand of an operator.

Figure 1:
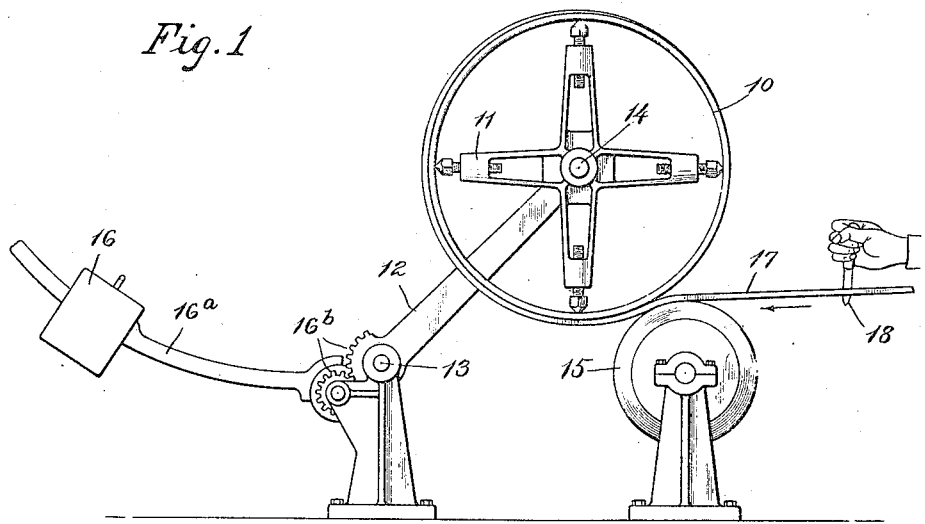
Figure 2:
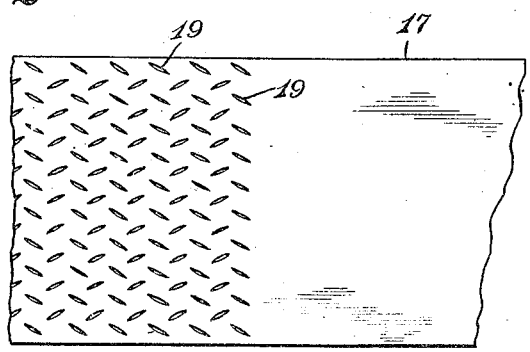
Fig. 2 is a fragmentary plan view of the gashed strip.

In the drawings, 10 is a metal rim on which a solid rubber tire is to be built and vulcanized, 11 is a rotatable chuck supporting said rim, 12 is a cradle or lever fulcrumed at 13, upon which the shaft 14 of said chuck is freely journaled, and 15 is a positively-driven cloth-covered roller against which the tire as it is built up in successive laminations is pressed by the weight of the tire, rim, chuck, and cradle, augmented by that of weight 16 on an arm 16$^a$ geared at 16$^b$ to the hub of the lever or cradle 12.

17 is the strip of warm and tacky raw rubber compound which comes from the calender or other sheeting apparatus and is wound in successive layers or laminations on the rim 10 to make the tire. With a knife 18 manipulated by the hand of an operator, the strip 17 is cut or gashed throughout substantially its entire width and length with a large number of closely-spaced slits 19, 19, these slits, as shown, being obliquely transverse to the side edges of the strip and disposed in two sets or series, the members of which are interspersed and located at an angle to each other. The individual slits preferably do not communicate with each other nor reach the side edges of the strip 17, so that the continuity of the strip as a whole is not destroyed. The slits open up slightly, owing to the tension on the rubber strip, but close together again in the tire. After the tire has been built up with strips of graduated width approximately to its ultimate size and shape it is vulcanized in mass on the rim, under heavy mechanical pressure in a mold, in the usual manner.

The adjacent surfaces of each strip will become reunited by the pressure to which the rubber is subjected in the building up and subsequent holding and vulcanizing of the tire, but the healing or knitting of these wounds or slits will be such that the continuity of the grain or fibre is permanently destroyed in the completed tire. This effect is probably due to the fact that perfect realignment of the severed portions of the molecular striations constituting the so-called grain in the rubber is not secured, but it may also be due in part or principally to the fact that the coalescence of the cut surfaces partakes of the nature of surface adhesion and not molecular cohesion in the strict sense. Better adhesion of the adjacent plies also results from this method, probably because of the presence of the numerous lips or edges of raw rubber which stick more closely to the adjoining ply surfaces than a continuous ply will do. But whatever may be the correct theory for explaining the phenomena, the effect is found to be that the tendency of the rubber of the tire to strip off under severe use is substantially eliminated, and the strength of the tire as a whole is considerably improved. It is further found that in a tire having an inner layer of hard rubber for connecting the soft resilient rubber to the metal rim, the adhesion between the soft and the hard rubber is improved by applying this method to the innermost lamination of the soft rubber stock.

Figure 3:
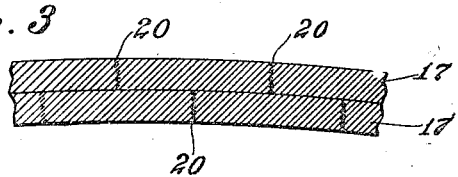
Fig. 3 is a longitudinal section showing approximately the condition of two adjacent plies of the gashed raw stock in the unvulcanized tire.
Figure 4:
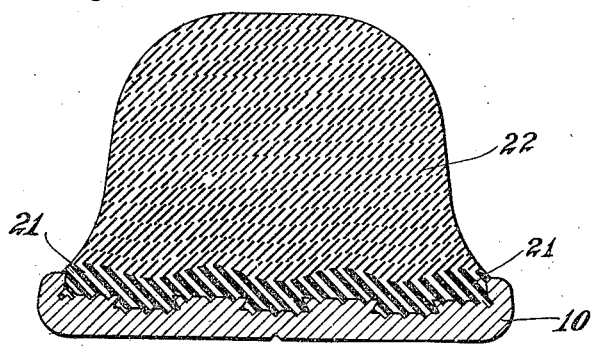
Fig. 4 is a cross-section of the vulcanized tire showing conventionally its laminated structure.

Fig. 3 shows approximately the condition of two adjacent laminations or plies of the raw strip 17 in the tire, with the closed slits indicated at 20. In Fig. 4 the vulcanized tire is shown on its rim 10, the hard and soft rubber parts being represented at 21 and 22, and the laminated structure of the soft-rubber part being indicated by the horizontal rows of cross-hatching. It will be understood that while the laminations are not readily detectable in a section of the finished tire, they are nevertheless present in its structure and their presence, as well as that of the closed perforations, can usually be discovered by suitable methods of dissection.

This process may, if desired, be applied to a part only of the rubber in the tire, although I prefer to employ it throughout the structure of the tire, or at least throughout the soft-rubber part when the tire is of a composite soft and hard rubber formation. The invention is not limited in a broad sense to the use of a cutting operation as distinguished from other modes of perforation, nor is it broadly limited as to the place on the strip or tire at which the operation is performed. It will be understood that the method may be carried out with an automatic or any other suitable form of apparatus, the details of which are immaterial to the present invention. In addition to solid tires, it may be applied to the treads of pneumatic tires or to the structure of rubber articles other than tires wherever its use may be found to be beneficial.

I claim:

1. The herein-described method which comprises building up a laminated article from a sheet or strip or raw rubber compound, breaking the longitudinal continuity of the grain of said sheet or strip without destroying its continuity as a whole, and subjecting the article to pressure and vulcanization.

2. The method of making rubber tires which comprises building the tire with successive laminations of raw rubber strip stock, interrupting the longitudinal continuity of the grain of the strip before building the same into the tire, without destroying the continuity of the said strip as a whole, and vulcanizing said tire under pressure.

3. The method of building solid rubber tires which comprises winding upon a metal rim rubber stock in strip form in successive laminations, interrupting the longitudinal continuity of the grain of said strip stock before building it into the tire, without destroying the continuity of the strip as a whole, and vulcanizing said tire on the rim.

4. The method of making rubber tires which consists in winding raw rubber sheeted stock in strip form in successive laminations to build up the tire, gashing the stock at a multiplicity of closely-adjacent points without destroying its continuity as a whole as it is being built into the tire, and vulcanizing the tire.

5. A step in the method of preparing raw rubber sheet stock for the manufacture of vulcanized rubber articles which comprises gashing the sheet with through slits at a multiplicity of closely-adjacent points without destroying its continuity as a whole.

6. The method of making solid rubber tires which comprises winding upon a metal rim a plurality of layers of raw calendered sheet stock in strip form, gashing the strip with through slits at a multiplicity of closely-adjacent points without destroying its continuity as a whole, immediately before it is wound up in the tire, and vulcanizing the tire on said rim under heat and pressure, the surfaces of the gashes being reunited in the finished tire.

7. The herein-described method which comprises producing a sheet of raw rubber compound in strip form, forming therein a multiplicity of closely-adjacent unconnected slits throughout substantially the whole area of said strip in successive laminations, building the strip into a rubber article and vulcanizing the said article.

8. The herein-described method which comprises producing a strip of raw rubber compound, forming therein a multiplicity of unconnected closely-adjacent slits interspersed at angles to each other and at oblique angles to the sides of the strip throughout a large part of the area of the latter, building said strip in successive laminations into a solid tire, and vulcanizing said tire, the surfaces of the slits reuniting during vulcanization.

9. A rubber structure including laminations vulcanized together and having numerous reunited faults in the grain of the rubber.

10. A solid rubber tire formed with laminations parallel to its base, vulcanized into a unit structure and provided with numerous, closely-adjacent reunited faults in the grain of the rubber.

In testimony whereof I have hereunto set my hand this 30th day of April, 1920.

WALTER H. ALLEN